United States Patent
Takita

(10) Patent No.: US 11,790,823 B2
(45) Date of Patent: Oct. 17, 2023

(54) IMAGE DISPLAY DEVICE

(71) Applicant: Marelli Corporation, Saitama (JP)

(72) Inventor: Toshifumi Takita, Saitama (JP)

(73) Assignee: Marelli Corporation, Saitama (JP)

( * ) Notice: Subject to any disclaimer, the term of this patent is extended or adjusted under 35 U.S.C. 154(b) by 160 days.

(21) Appl. No.: 17/434,461

(22) PCT Filed: Dec. 9, 2019

(86) PCT No.: PCT/JP2019/048069
§ 371 (c)(1),
(2) Date: Aug. 27, 2021

(87) PCT Pub. No.: WO2020/183821
PCT Pub. Date: Sep. 17, 2020

(65) Prior Publication Data
US 2022/0148485 A1     May 12, 2022

(30) Foreign Application Priority Data

Mar. 11, 2019 (JP) ................................ 2019-044124

(51) Int. Cl.
*G09G 3/20* (2006.01)
*B60R 1/26* (2022.01)
*B60R 1/12* (2006.01)

(52) U.S. Cl.
CPC .............. *G09G 3/2003* (2013.01); *B60R 1/26* (2022.01); *B60R 1/12* (2013.01); *B60R 2001/1253* (2013.01); *B60R 2300/30* (2013.01); *G09G 2360/141* (2013.01); *G09G 2360/144* (2013.01); *G09G 2380/10* (2013.01)

(58) Field of Classification Search
CPC ........................................................ B60R 1/00
See application file for complete search history.

(56) References Cited

U.S. PATENT DOCUMENTS

2007/0139562 A1   6/2007   Miyake
2018/0069998 A1*   3/2018   Nakata .................. H04N 23/73
(Continued)

FOREIGN PATENT DOCUMENTS

JP     2007-174229 A     7/2007
JP     2007-241059 A     9/2007
(Continued)

*Primary Examiner* — Nan-Ying Yang
(74) *Attorney, Agent, or Firm* — Global IP Counselors, LLP

(57) ABSTRACT

An image display device includes an imaging unit, a color temperature detection unit, a color temperature sensor, a white balance adjustment unit and a display unit. The imaging unit is configured to capture an image of a rear of a vehicle. The color temperature detection unit is configured to detect a color temperature of a captured image. The color temperature sensor is installed at a front of the vehicle to detect a color temperature of incident light. When a difference between the color temperature of the captured image and the color temperature of the incident light is a color temperature threshold value or greater, the white balance adjustment unit is configured to switch from a first white balance adjustment based on the color temperature of the captured image to a second white balance adjustment based on the color temperature of the incident light.

8 Claims, 7 Drawing Sheets

(56) References Cited

U.S. PATENT DOCUMENTS

2018/0234610 A1    8/2018  Nakamura
2020/0154083 A1*   5/2020  Zhang .................. H04N 23/843

FOREIGN PATENT DOCUMENTS

| JP | 2008-219128 A | 9/2008 |
| JP | 2009-171122 A | 7/2009 |
| JP | 2010-283718 A | 12/2010 |
| JP | 2018-132614 A | 8/2018 |

* cited by examiner

IMAGE DISPLAY DEVICE

CROSS-REFERENCE TO RELATED APPLICATIONS

This is a U.S. national phase application of PCT/JP2019/048069, filed on Dec. 9, 2019, which claims priority to Japanese Patent Application No. 2019-044124, filed on Mar. 11, 2019. The entire disclosure of Japanese Patent Application No. 2019-044124 is hereby incorporated herein by reference.

TECHNICAL FIELD

The present invention relates to an image display device.

BACKGROUND ART

Though a vehicle comprises an outside mirror so that the rear and/or side of the vehicle is clearly visible when a driver is driving the vehicle, it is proposed that an image display device be used instead of this outside mirror, or in combined use with the outside mirror. The image display device captures the periphery of the vehicle using a camera, and displays the captured images on displays installed inside the vehicle.

Photographic subjects or scenery captured by the camera are all reflected light. In other words, the color temperature of reflected light also changes according to the color temperature of incident light irradiated with sunlight, nighttime, tunnel lighting etc. The sunlight changes moment by moment depending on the time, season, and weather, and the color temperature of illuminating lamps differs by the type of light source such as an LED, sodium lamp, etc. Even in such a case, it is necessary to match the hue of the image captured by the camera with the color temperature of the atmosphere. In light of that, to have a region estimated to be white be closer to white in the captured image, automatic white balance processing is performed to correct the color temperature detected from the captured image (see Japanese Laid-Open Patent Publication No. 2010-283718, for example).

SUMMARY

However, in states such as in time periods when the sun is low such as morning or evening, or when water has pooled on the road surface after a rain shower, there are cases when strong reflected light is reflected from the photographic subject to the camera. When unintended reflected light is reflected in the captured image at a high area ratio, the average color temperature of the area detected from the captured image decreases, so when automatic white balance processing is performed in that state, there are cases when the overall captured image after correction looks bluish. As a result, the driver's view in front of the vehicle and how the captured image displayed by the display looks are different, and this may give the driver a sense of incongruity.

In image display devices, there is a demand to have how the captured image displayed by the display looks be close to the driver's view regardless of the strength of the reflected light, reducing the sense of incongruity that the driver remembers in the captured image.

An image display device of the present invention comprises: an imaging unit that captures an image of the rear of a vehicle, a color temperature detection unit that detects the color temperature of the image captured by the imaging unit, a color temperature sensor that is installed at the front of the vehicle, and that detects the color temperature of incident light at the front of the vehicle, a white balance adjustment unit that performs adjustment of the white balance of the captured image, and a display unit that displays the captured image adjusted by the white balance adjustment unit, wherein when the difference between the color temperature of the captured image detected by the color temperature detection unit and the color temperature of the incident light detected by the color temperature sensor is a threshold value or greater, the white balance adjustment unit switches from a first white balance adjustment based on the color temperature of the captured image to a second white balance adjustment based on the color temperature of the incident light.

According to the present invention, the image display device is able to have how the captured image displayed by the display looks be close to the driver's view, and to reduce the sense of incongruity that the driver remembers in the captured image.

DETAILED DESCRIPTION OF EMBODIMENTS

Figure 1:
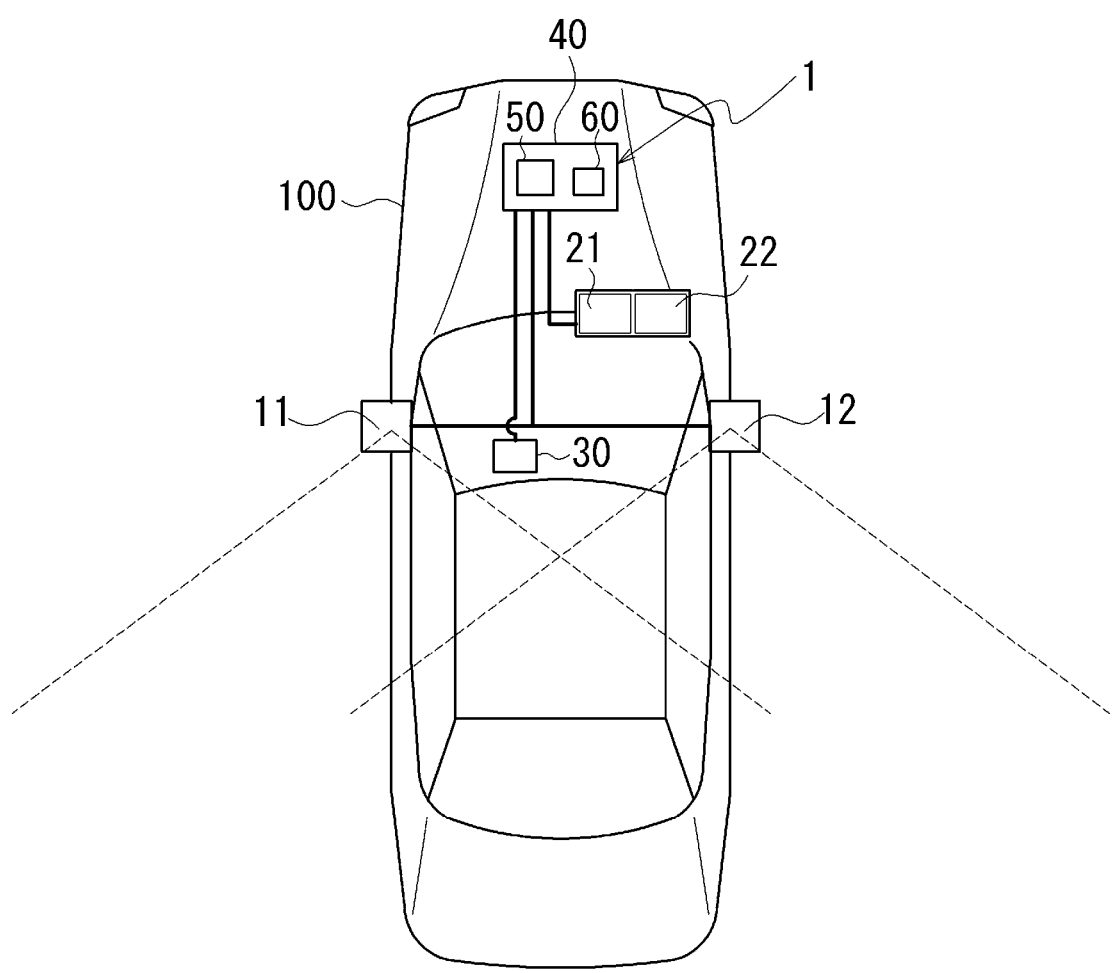
FIG. 1 is a drawing showing a vehicle in which is installed an image display device of an embodiment.

Hereafter, an image display device of an embodiment of the invention is explained while referring to the drawings.

FIG. 1 is a drawing showing a vehicle in which is installed the image display device of the embodiment.

Figure 2:
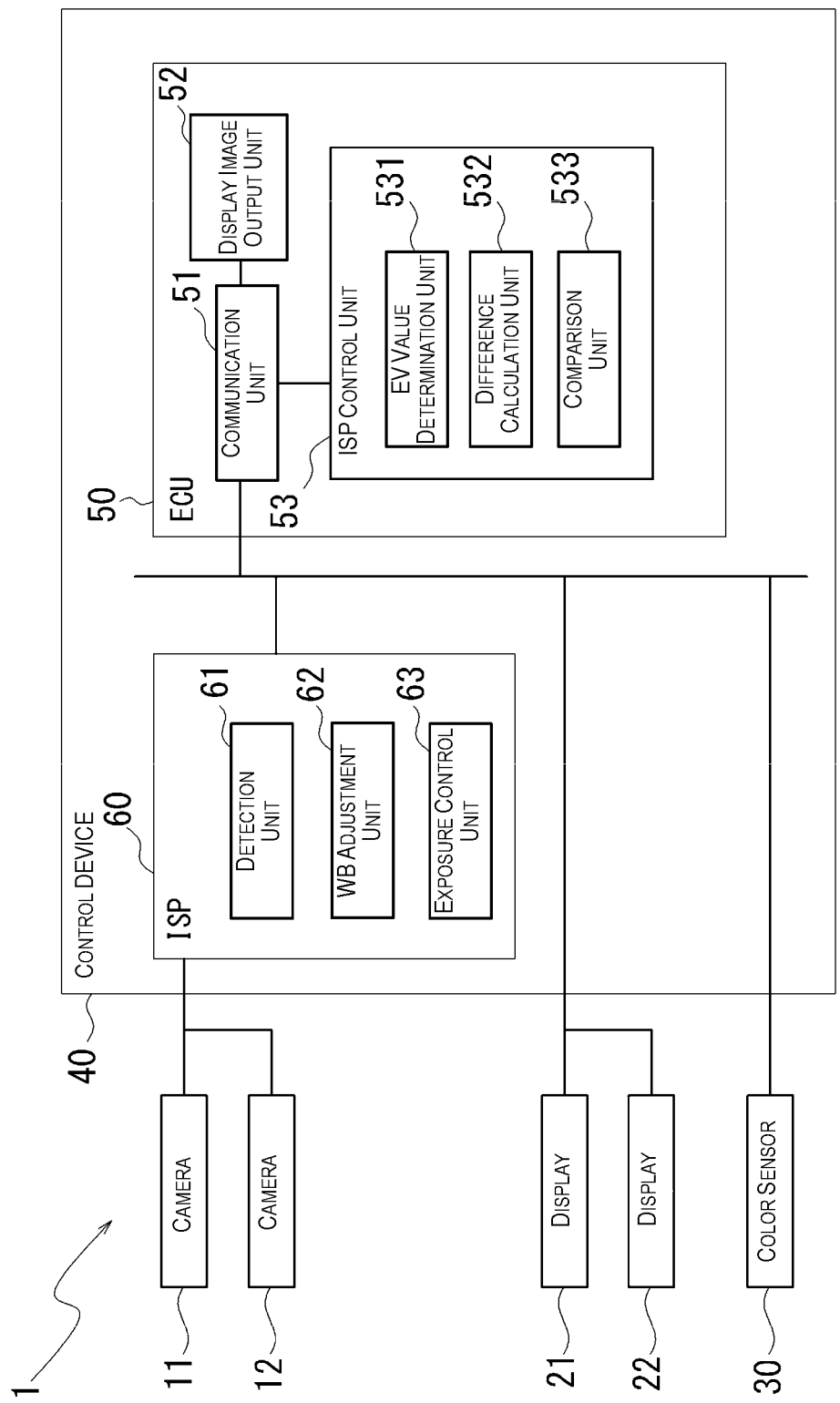
FIG. 2 is a bock diagram showing the configuration of the image display device.

FIG. 2 is a block diagram showing the configuration of the image display device.

As shown in FIG. 1, an image display device 1 comprises cameras 11, 12, displays 21, 22, a color sensor 30, and a control device 40.

As shown in FIG. 2, the control device 40 comprises an ECU 50 (Electronic Control Unit) that performs overall control of the image display device, and an ISP 60 (Image Signal Processor) that mainly performs image processing.

As shown in FIG. 1, the cameras 11, 12 respectively have lenses installed on the left and right front doors of a vehicle 100, facing the rear of the vehicle 100.

The cameras 11, 12 are constituted by: an imaging element consisting of a lens (not illustrated), a motor, a CMOS sensor, a color filter, etc.; a CPU (Central Processing Unit) that controls the image element; and memory that stores captured images and various settings, etc.

FIG. 1 shows the respective image range of the cameras 11, 12 with dotted lines, and the camera 11 captures the left side and rear of the vehicle 100. The camera 12 captures the right side and rear of the vehicle 100. The cameras 11, 12 are fixed types, and capture a fixed imaging range. The cameras 11, 12 always perform imaging while the vehicle 100 is traveling.

The displays 21, 22 are installed on the dashboard or front pillar inside the vehicle 100, for example. The display 21 displays images captured by the camera 11, and the display 22 displays images captured by the camera 12. In FIG. 1, the displays 21, 22 are arranged side by side, but the displays 21, 22 may also be arranged respectively at the left and right front pillars.

When changing course, etc., the driver of the vehicle 100 checks the side and rear of the vehicle 100 by viewing the captured images displayed by the displays 21, 22 in combination with the outside mirror or instead of the outside mirror.

The color sensor 30 is installed at the front of the vehicle 100, and detects a color temperature Ts showing the color of the light made incident from a light source (hereafter called "incident light"), and an illuminance Is that shows the brightness of the incident light. The color sensor 30 can be attached above the surface inside the vehicle on the front windshield as shown in the drawing, for example, but the installation location is not limited as long as it is a position at which incident light can be detected at the front of the vehicle 100. The color sensor 30 detects the color temperature Ts and the illuminance Is at prescribed sampling cycles, and outputs data to the ECU 50.

As shown in FIG. 2, the ISP 60 is connected by an in-vehicle LAN with the cameras 11,12 and the ECU 50, and performs transfer of data with each of these. Captured images of the cameras 11, 12 are input in sequence to the ISP 60. The ISP 60 performs image processing of the captured images and outputs these to the ECU 50, and also performs imaging control of the cameras 11, 12 based on the detected results of the captured images.

There are various types of processing performed by the ISP 60, but with this embodiment, explained are adjustment processing of the white balance of the captured images, and exposure control of the cameras 11, 12.

The ISP 60 comprises a detection unit 61, a white balance adjustment unit 62 (hereafter called "WB adjustment unit 62"), and an exposure control unit 63. The functional compositions of these are realized by executing a program stored in the memory of the ISP 60.

The detection unit 61 acquires captured images of the cameras 11, 12 at prescribed sampling cycles, detects their color temperature Tc and illuminance Ic, and outputs those to the ECU 50. The detection unit 61, for example, can detect the average value of the color temperature and the illuminance of each pixel constituting the captured image as the color temperature Tc and the illuminance Ic of the overall captured image. The detection unit 61 can detect the color temperature Tc and the illuminance Ic from both captured images of the camera 11 and the camera 12, and calculate their average value, but it is also possible to detect the color temperature Tc and the illuminance Ic from only one of the captured images.

The captured images of the cameras 11, 12 reflect reflected light in which incident light from the light source is reflected by a photographic subject. Therefore, whereas the abovementioned color sensor 30 is an item that detects the color temperature Ts and the illuminance Is of the incident light, the detection unit 61 detects the color temperature Tc that shows the color of, and the illuminance Ic that shows the brightness of the reflected light. Specifically, data of the color temperature and the illuminance of both the incident light and the reflected light are input to the ECU 50 at prescribed sampling cycles.

The WB adjustment unit 62 performs image processing that adjusts the white balance of the respective captured images of the cameras 11, 12.

The exposure control unit 63 generates exposure control signals that control the exposure time of the cameras 11, 12 to adjust the brightness of the captured images of the cameras 11, 12.

In the embodiment, the WB adjustment unit 62 and the exposure control unit 63 perform the process of switching between a first method that uses reflected light as a reference, and a second method that uses incident light as a reference. Switching of the first method and the second method is performed according to a switching command from the ECU 50 described later.

As adjustment of the white balance, the WB adjustment unit 62 corrects the color temperature of the overall captured image so that region of the captured image estimated to be white is close to white, performing so-called automatic white balance processing (hereafter called "AWB processing").

Though a well-known method can be used for the AWB processing, the WB adjustment unit 62 uses the color temperature Tc of the reflected light detected by the detection unit 61 as the subject of correction in the first method, and uses the color temperature Ts of the incident light detected by the color sensor 30 as the subject of correction in the second method. Data of the color temperature Tc and the color temperature Ts are included in the switching command from the ECU 50, and the WB adjustment unit 62 acquires those data to perform processing.

The exposure control unit 63 corrects the exposure value (hereafter called "EV value") showing the brightness of the captured image so as to obtain a suitable exposure for which the average reflectance of the overall captured image is 18%, and performs so-called automatic exposure control (hereafter called "AE control") that controls the exposure of the cameras 11, 12 based on the EV value after correction.

Though a well-known method can be used for the AE control, the exposure control unit 63 uses an EV value Vc based on the illuminance Ic of the reflected light detected by the detection unit 61 in the first method, and uses an Ev value Vs based on the illuminance Is of the incident light measured by the color sensor 30 in the second method.

The data of the EV value Vc and the EV value Vs are included in the switching command from the ECU 50.

The exposure control unit 63 calculates skew from the appropriate exposure range of the EV value Vc or the EV value Vs, and if that skew is the threshold value (2, for example) or greater, a control signal is generated to control the cameras 11, 12 to make the EV value Vc or the EV value Vs be the appropriate exposure.

The appropriate exposure range means an intermediate region in a state in which the captured image is not overexposed (whited out) or underexposed (blacked out), and the average reflectance of the overall captured image is near 18%, and the appropriate exposure range fluctuates depending on the imaging conditions of time and weather. Predetermined appropriate exposure ranges according to imaging conditions are stored in the memory of the ISP 60.

The exposure of the cameras 11, 12 is determined by the combination of exposure time and gain. A table in which are noted exposure time and gain combinations corresponding to each EV value is stored in the memory of the ISP 60. The exposure control unit 63 acquires the exposure time and gain combination corresponding to the EV value after correction, generates control signals including these data, and outputs those to the cameras 11, 12. The CPUs of the cameras 11, 12 adjust the exposure of the cameras 11, 12 by controlling the imaging element according to the inputted control signals.

In the cameras 11, 12 that have received control signals, by changing the exposure time and gain setting according to the control signal, the exposure of the cameras 11, 12 is controlled to be an appropriate exposure.

The ECU 50 is constituted by, for example, (not-illustrated) a CPU, memory such as RAM (Random Access Memory) and ROM (Read Only Memory), an input/output interface, and a computer-to-computer communication unit, etc.

As shown in FIG. 2, the ECU 50 comprises a communication unit 51, a display image output unit 52, and an ISP control unit 53. These functional compositions are realized by the CPU of the ECU 50 executing various applications stored in memory. In the memory, various types of information necessary for processing by the ECU 50 are stored, and processing results of each unit are temporarily stored.

The communication unit 51 is connected with the ISP 60, the color sensor 30, and the displays 21, 22 by the in-vehicle LAN, and performs data transfer with each of these. As described above, the data of the color temperature Ts and the illuminance Is of the incident light from the color sensor 30, and the data of the color temperature Tc and the illuminance Ic of the reflected light from the detection unit 61 of the ISP 60 are inputted at prescribed sampling cycles, and these data are stored in the memory of the ECU 50.

The display image output unit 52 outputs captured images of the cameras 11, 12 inputted from the ISP 60 and displays them as the display image on the displays 21, 22. The display image output unit 52 respectively outputs the captured image of the camera 11 as the display image of the display 21, and the captured image of the camera 12 as the display image of the display 22.

Though a detailed explanation is omitted, the display image output unit 52 may also perform the necessary processing for displaying the captured images on the displays 21, 22. The display image output unit 52, for example, may perform trimming processing that matches the captured images to the size of the displays 21, 22, or inversion processing to have the captured image look the same as the outside mirror, etc. Also, synthesis processing that superimposes driving assistance information on the captured image may also be performed.

The ISP control unit 53 controls the method of the processing performed by the WB adjustment unit 62 and the exposure control unit 63 of the ISP 60. As described previously, the processing of the WB adjustment unit 62 and the exposure control unit 63 is performed by one of the first method that uses reflected light as the reference and the second method that uses incident light as the reference. The ISP control unit 53 determines switching between the first method and the second method by comparing the data of the incident light and the reflected light inputted from the color sensor 30 and the detection unit 61 of the ISP 60.

To determine the switching of the first and second methods, the ISP control unit 53 comprises an EV value determining unit 531, a difference calculation unit 532, and a comparison unit 533.

Figure 3:
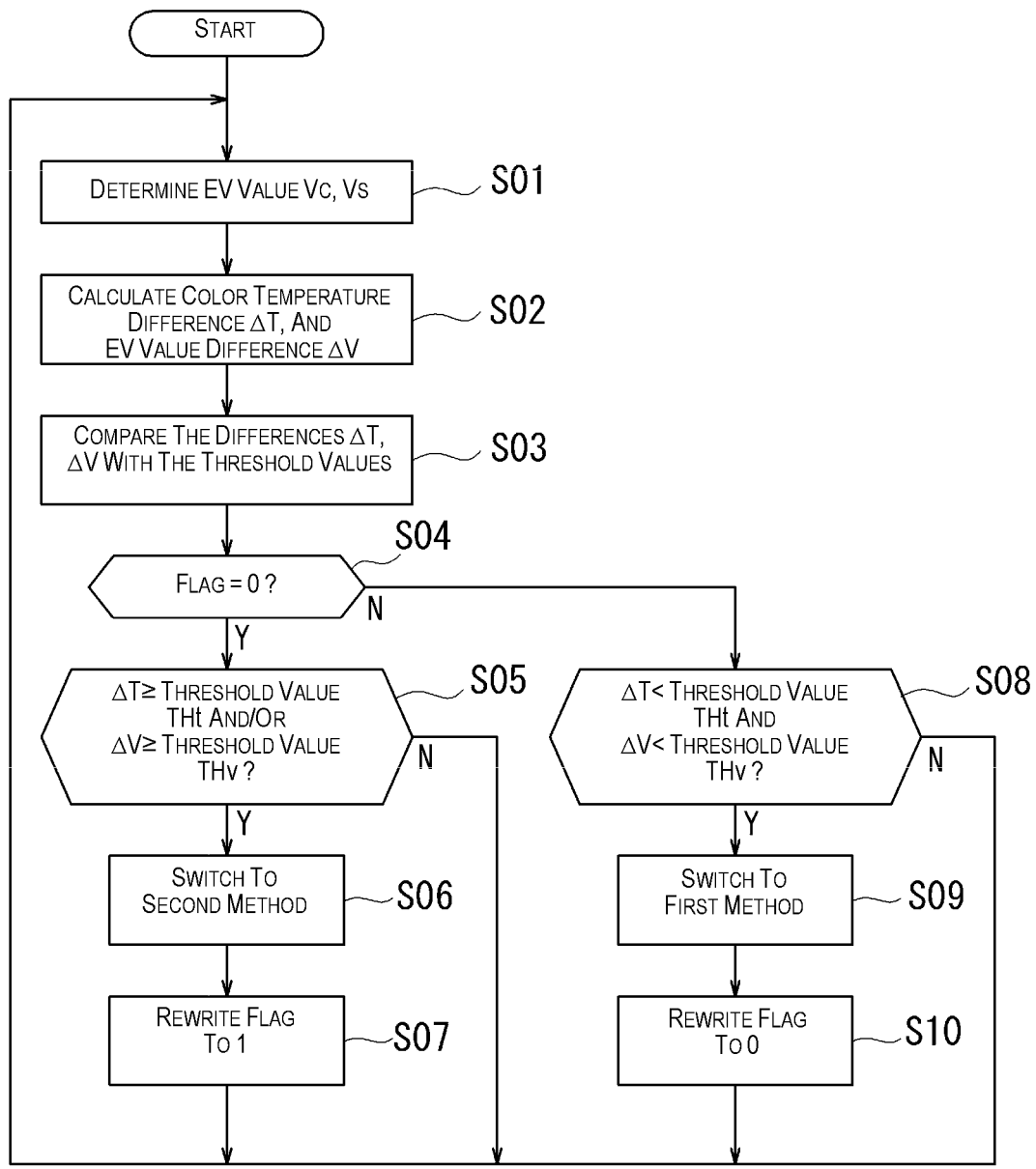
FIG. 3 is a flow chart showing the processing of an ISP control unit.

FIG. 3 is a flow chart showing the processing of the ISP control unit 53.

Flags showing the processing method of the ISP 60 are stored in the memory of the ECU 50. The flags can be, for example, "0" for the first method, and "1" for the second method.

As shown in FIG. 3, the EV value determining unit 531 references the memory, acquires the illuminance Ic of the reflected light inputted by the ISP 60, and the illuminance Is of the incident light inputted by the color sensor 30, and determines the respectively corresponding EV value Vc, Vs (step S01).

There is a correlation between illuminance and the EV value which are indices showing brightness, and a table showing the correspondence of the illuminance and the EV value is stored in the memory of the ECU 50. The EV value determining unit 531 references this table and determines the EV value Vc of the reflected light and the EV value Vs of the incident light. The EV value determining unit 531 temporarily stores the determined EV values Vc, Vs in memory.

The difference calculation unit 532 references the memory, and respectively calculates a difference ΔT of the color temperature Tc of the reflected light and the color temperature Ts of the incident light, and a difference ΔV of the EV value Vc of the reflected light and the EV value Vs of the incident light (step S02). The difference calculation unit 532 calculates ΔT and ΔV as absolute values.

The comparison unit 533 compares the respective threshold values THt, THv of the difference ΔT of the color temperature and the difference ΔV of the EV value calculated by the difference calculation unit 532 (step S03), and determines switching between the first method and the second method.

The threshold values THt, THv are values showing that the size of the difference ΔT of the color temperature and the difference ΔV of the EV value is the size for switching the processing method of the ISP 60, said another way, the size of the divergence between the reflected light and the incident light is a value showing that there is a possibility that the driver will remember a sense of incongruity.

The threshold value THt of the difference in the color temperature can be approximately 1000 K, for example, and the threshold value THv of the difference in the EV value can be 2, for example.

The processing of the ISP 60 is performed with the first method based on the reflected light if the divergence between the reflected light and the incident light is not large. However, as explained hereafter, there are cases when the divergence between the reflected light and the incident light may increase according to the environmental conditions. In this case, when processing is performed using the first method, the driver's view and the way the display images displayed on the displays 21, 22 look is different, and there is a possibility of giving the driver a sense of incongruity. For that reason, with the embodiment, when the divergence between the reflected light and the incident light is large, there is a switch from the first method to the second method.

Figure 4:
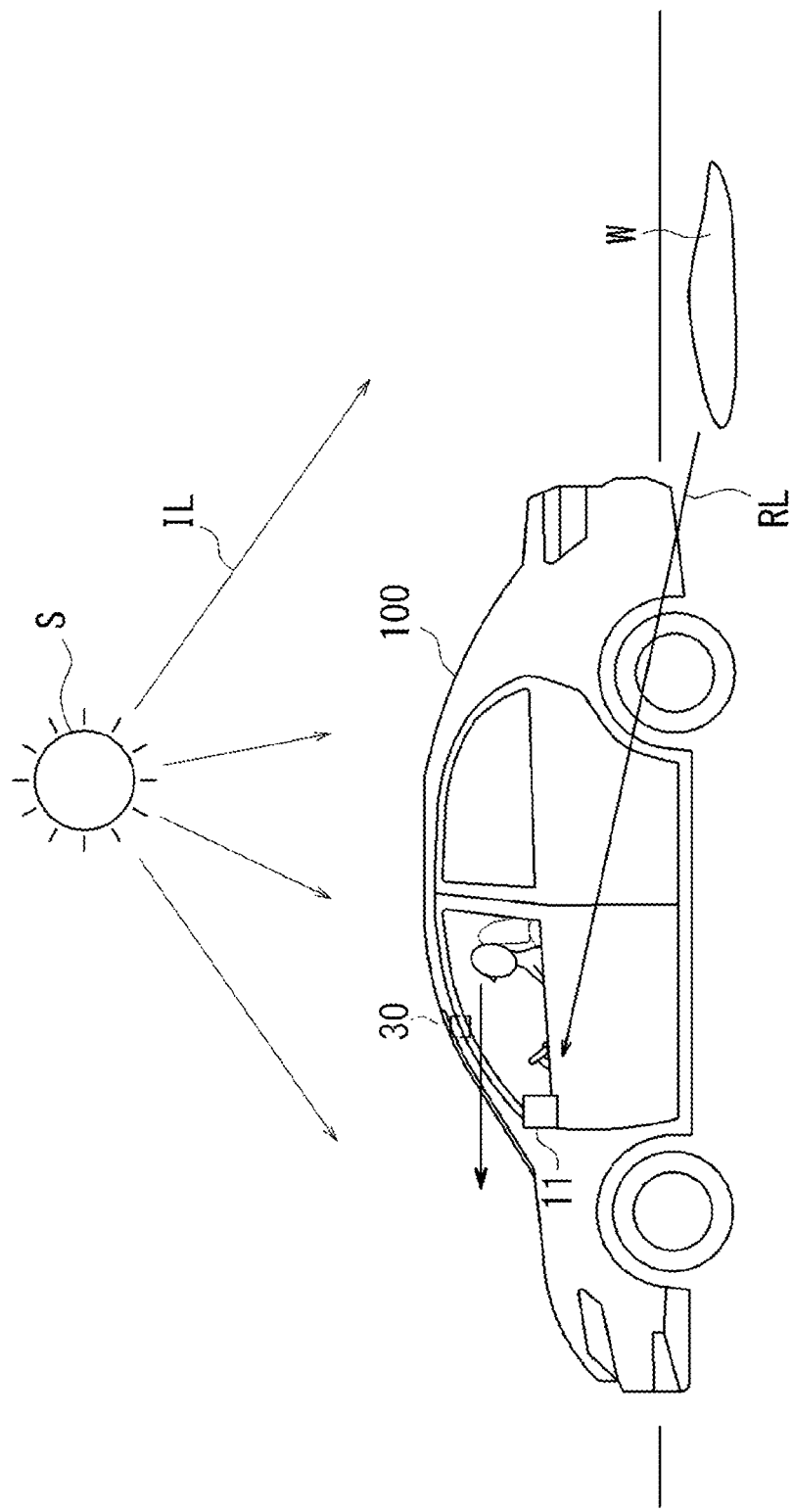
FIG. 4 is a drawing showing incident light from a light source and reflected light from a photographic subject.

FIG. 4 is a drawing showing the incident light from the light source and the reflected light from the photographic subject.

Figure 5:
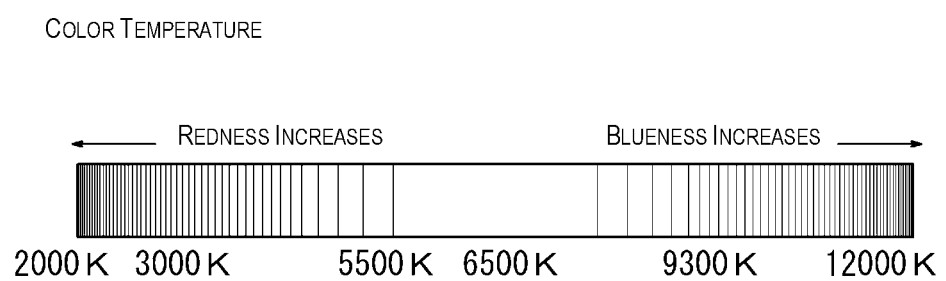
FIG. 5 is a graph showing color temperature.

FIG. 5 is a graph showing the color temperature.

Figure 6:
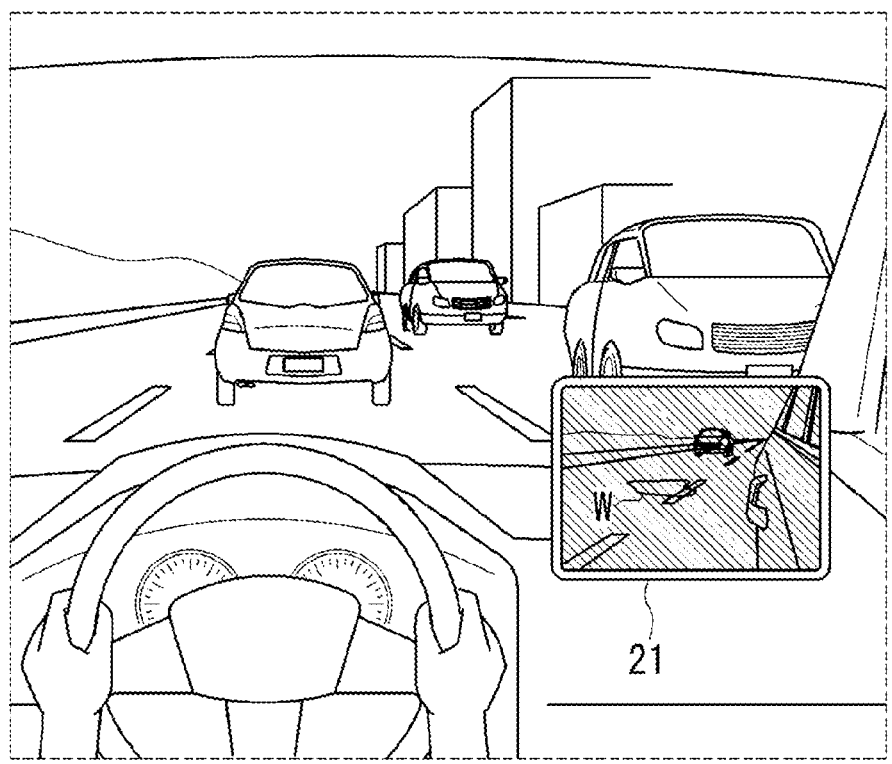
FIG. 6 is a drawing showing a comparison example of the driver's view and an image displayed on a display.

FIG. 6 is a drawing showing a comparison example of the driver's view and the image displayed in the display. For simplicity, FIG. 6 illustrates only the display 21.

As shown in FIG. 4, normally, the distance between the vehicle 100 and the light source S is not different at the front and rear of the vehicle 100. Specifically, at the front of the vehicle 100 that the driver sees and the rear captured by the camera 11, there is no large difference in the color temperature or brightness of the incident light IL, and the driver also intuitively grasps when the front and rear of the vehicle 100 look the same.

Meanwhile, as described above, what is projected in the captured image of the camera 11 is a reflected light RL from the photographic subject. For example, in a state in which a water puddle W has formed on the road surface after a rain shower, the incident light IL is reflected on the water puddle W, and there are cases when strong reflected light RL is reflected in the captured image of the camera 11. In the captured image, this strong reflected light RL portion becomes a reddish white.

As shown in FIG. 5, the center part of the color temperature is a white region, and when the color temperature becomes higher, it becomes a cool color, and when it becomes lower, it becomes a warm color. The AWB processing performed by the WB adjustment unit 62 is processing by which the color temperature of the overall captured image is close to that of the center part.

In the captured image, the higher the area ratio of the reddish part, the lower the color temperature Tc of the overall captured image detected by the detection unit 61 of the ISP 60. When AWB processing is performed with this low color temperature Tc as the reference, correction is performed to raise the color temperature Tc of the overall captured image. By doing this, though shown by cross hatching in FIG. 6, the image displayed on the display 21 after AWB processing will look more bluish than the driver's view.

Also, by reflecting strong reflected light RL, the illuminance Ic of the captured image detected by the detection unit 61 of the ISP 60 becomes higher. As a result, regardless of being a time period when the actual EV value is lower such as evening, for example, the EV value Vc corresponding to the illuminance Ic becomes higher, and it is easier to become skewed from the appropriate exposure range. When AE control is performed with this EV value Vc as the reference, the exposure of the cameras 11, 12 is changed to make the captured image darker, and it is possible that the image displayed in the display 21 will be darker than the driver's view.

In this way, with the AWB processing and the AE control of the first method based on the color temperature Tc and the illuminance Ic detected from the captured image in which strong reflected light RL is reflected, it is possible that an image that looks different from the driver's view will be displayed in the display 21. This kind of phenomenon can occur in time periods in which the sun is low and can easily reflect on the road surface or car body such as morning or evening, etc., in addition to after a rain shower.

Furthermore, in the state after the rain shower shown in FIG. 4, since the water puddle W may or may not be reflected in the captured image by traveling of the vehicle 100, it is easy for the color temperature Tc and the illuminance Ic detected from the captured image to fluctuate. In such a case, the color temperature and brightness of the image displayed on the display 21 changes rapidly, and there is a possibility of the sense of incongruity given to the driver becoming greater.

Meanwhile, the color sensor 30 is installed on the top part of the front windshield at the front of the vehicle 100, and detects the incident light IL from the light source S. For that reason, it is possible to detect the color temperature Ts and the illuminance Ic that are not affected by the reflected light RL from the water puddle W shown in FIG. 4. If the AWB processing and the AI control are performed using the second method based on the color temperature Ts and the illuminance Ic of this incident light IL, an image close to that of the driver's view can be displayed on the display 21.

In light of that, with the embodiment, the comparison unit 533 compares the reflected light RL and the incident light IL, and when the divergence between these has become great, by switching from the first method to the second method, an image close to that of the driver's view is displayed on the displays 21, 22. Also, when the divergence between the reflected light RL and the incident light IL becomes smaller, there is a switch again from the second method to the first method.

Returning to FIG. 3, as described previously, the comparison unit 533 compares the respective threshold values THt, THv of the reflected light RL and the incident light IL difference ΔT in the color temperature, and the difference ΔV of the EV value (step S03).

When the flag is "0" indicating the first method (step S04: Yes), if one or both of the color temperature difference ΔT and the EV value difference ΔV is the threshold value THt, THv or greater (step S05: Yes), the comparison unit 533 makes a determination to switch to the second method (step S06). The comparison unit 533 generates a command switching to the second method and outputs this to the ISP 60, and rewrites the flag from "0" to "1" indicating the second method (step S07).

When generating the command switching to the second method, the comparison unit 533 includes in the command the data of the color temperature Ts measured by the color sensor 30 and the EV value Vs determined by the EV value determining unit 531 stored in memory. After outputting of the switching command, the process returns to step S01.

In the comparison unit 533, when both the color temperature difference ΔT and the EV value difference ΔV in step S05 are less than the threshold values THt, THv (step S05: No), it is not necessary to switch the method, so the process returns to step S01 without generating the switching command.

After switching to the second method, when both the color temperature difference ΔT and the EV value difference ΔV are less than threshold values THt, THv (step S04: No, step S08: Yes), the comparison unit 533 determines to switch to the first method (step S09). The comparison unit 533 generates the command switching to the first method and outputs that to the ISP 60, and rewrites the flag from "1" to "0" (step S10).

When generating the command switching to the first method, the comparison unit 533 includes in the command the data of the color temperature Tc detected by the detection unit 61 of the ISP 60 and the EV value Vc determined by the EV value determining unit 531 stored in memory. After outputting the switching command, the process returns to step S01.

If the status of one or both of the color temperature difference ΔT and the EV value difference ΔV being the threshold values THt, THv or greater is maintained in step S07 (step S08: No), to maintain the second method, the comparison unit 533 returns to step S01 without generating the switching command.

As described above, during traveling of the vehicle 100, for each prescribed sampling cycle, a determination is made of the size of the divergence between the incident light IL and the reflected light RL in the comparison unit 533 of the ECU 50, and if the divergence is large, the processing of the ISP 60 is switched from the first method to the second method, and if the divergence becomes small, processing is performed to again return from the second method to the first method.

As noted above, when the switching command is inputted from the ECU 50, the WB adjustment unit 62 and the exposure control unit 63 of the ISP 60 switch the processing to the first method or the second method indicated by the switching command. At this time, the WB adjustment unit 62 and the exposure control unit 63 acquire data of the color temperature Tc and the EV value Vc or the color temperature Ts or the EV value Vs included in the switching command and use those for the respective processing.

In FIG. 4, a state in which a strong reflected light RL is reflected in the captured image was explained as the state in which the divergence between the incident light IL and the reflected light RL becomes bigger, but for example, at the outlet of a tunnel, etc., there is also a state in which the incident light IL becomes stronger than the reflected light RL. The difference calculation unit 532 calculates the color temperature difference ΔT and the EV value difference ΔV of the reflected light RL and the incident light IL as absolute values, so in this kind of case as well, if the divergence between the reflected light RL and the incident light IL is large, switching is performed from the first method to the second method. This makes it possible to display an image close to that of the driver's view.

As described above, the image display device 1 of the embodiment
(1) comprises:
cameras 11, 12 (imaging units) that capture the image to the rear of the vehicle 100,
the detection unit 61 (color temperature detection unit) that detects the color temperature Tc of the captured images of the cameras 11, 12,
the color sensor 30 (color temperature sensor) that is installed at the front of the vehicle 100, and that detects the color temperature Ts of the incident light IL at the front of the vehicle 100,
the WB adjustment unit 62 (white balance adjustment unit) that performs white balance adjustment of the captured images, and
displays 21, 22 (display units) that display captured images adjusted by the WB adjustment unit 62, wherein
when the difference ΔT of the color temperature Tc (first color temperature) detected by the detection unit 61 and the color temperature Ts (second color temperature) detected by the color sensor 30 is the threshold value THt (color temperature threshold value) or greater, the WB adjustment unit 62 switches from the first method based on the color temperature Tc (first white balance adjustment) to the second method based on the color temperature Ts (second white balance adjustment).

The AWB processing of the captured images is normally performed based on the color temperature Tc detected by the captured image reflecting the reflected light RL, and reflected light control is performed. However, in time periods when the sun is low such as morning or evening, or in a state when there are water puddles on the road surface after a rain shower, there are cases when strong reflected light RL is reflected from the photographic subject onto the cameras 11, 12 that capture the rear of the vehicle 100. The color temperature Tc detected from the captured image tends to decrease due to the strong reflected light RL, and this brings the possibility of there being a difference between how the captured image after the AWB processing and the driver's view look, giving a sense of incongruity to the driver. With the embodiment, the color sensor 30 was provided that detects the color temperature Ts of the incident light IL around the vehicle 100. AWB processing is performed that switches from the first method (reflected light control) to the second method (incident light control) according to the difference between the color temperature Tc of the reflected light RL and the color temperature Ts of the incident light IL. This makes it possible to display on the displays 21, 22 captured images that are close to how the driver's view looks at the front of the vehicle 100 with a reduced sense of incongruity, regardless of the strength of the reflected light RL.

Also, by providing the color sensor 30 at a position that can detect the incident light IL at the front of the vehicle 100 that the driver sees, the color sensor 30 can detect the color temperature and the illuminance close to those of the driver's view. This makes it possible to display on the displays 21, 22 captured images for which the sense of incongruity has been reduced in the second method.

(2) The image display device 1 comprises
the detection unit 61 (illuminance detection unit) that detects the illuminance Ic (brightness) of the captured image,
the color sensor 30 (illuminance sensor) that is installed at the front of the vehicle 100, and that detects the illuminance Is (brightness) of the incident light IL at the front of the vehicle 100, and
the exposure control unit 63 that controls the exposure of the imaging unit, wherein
when the difference ΔV between the EV value Vc (brightness) of the captured image and the EV value Vs (brightness) of the incident light IL is the threshold value THv (brightness threshold value) or greater, the exposure control unit 63 switches from the first method based on the EV value Vc of the captured image (first exposure control) to the second method based on the EV value Vs of the incident light IL (second exposure control).

When strong reflected light RL is reflected in the captured image, there is also an effect on the illuminance Ic detected from the captured image, so when exposure adjustment is performed based on the EV value Vc determined from the illuminance Ic, there is a difference in how the captured image and the driver's view look, and there is a possibility of giving a sense of incongruity to the driver. With the embodiment, switching is done between the first method (reflected light control) and the second method (incident light control) according to the difference ΔV of the EV value Vc determined from the reflected light RL and the EV value Vs determined from the incident light IL. This makes it possible to have the way the captured image looks after AE control look close to the driver's view, and possible to reduce the sense of incongruity given to the driver. A switch is made to incident type control that is not affected by the reflected light RL, and AE control is performed. This makes it possible to display on the displays 21, 22 captured images close to the way the driver's view of the front of the vehicle 100 looks, with a reduced sense of incongruity, regardless of the strength of the reflected light RL.

(3) The WB adjustment unit 62 and the exposure control unit 63 each switch to the second method when either of the difference ΔT between the color temperature Tc and the color temperature Ts, and the difference ΔV between the EV value Vc and the EV value Vs is the threshold value THt, THv or greater.

If either of the color temperature difference ΔT and the EV value difference ΔV is the threshold value THt, THv or greater, it is possible that the captured image will give a sense of incongruity to the driver, so by switching both the AWB processing and the AE control to the second method (incident light control), it is possible to display the image with a reduced sense of incongruity for the driver.

Switching of the first method and the second method is not limited to the items explained with the embodiment. Only in a case when both the color temperature difference ΔT and the EV value difference ΔV have exceeded the threshold values THt, THv is it acceptable to switch to the second method. Alternatively, it is also possible to switch only the AWB processing to the second method when only the color temperature difference ΔT is the threshold value THt or greater, and to switch only the AE control to the second method when only the EV value difference ΔV is the threshold value THv or greater.

Modification Example 1

Figure 7:
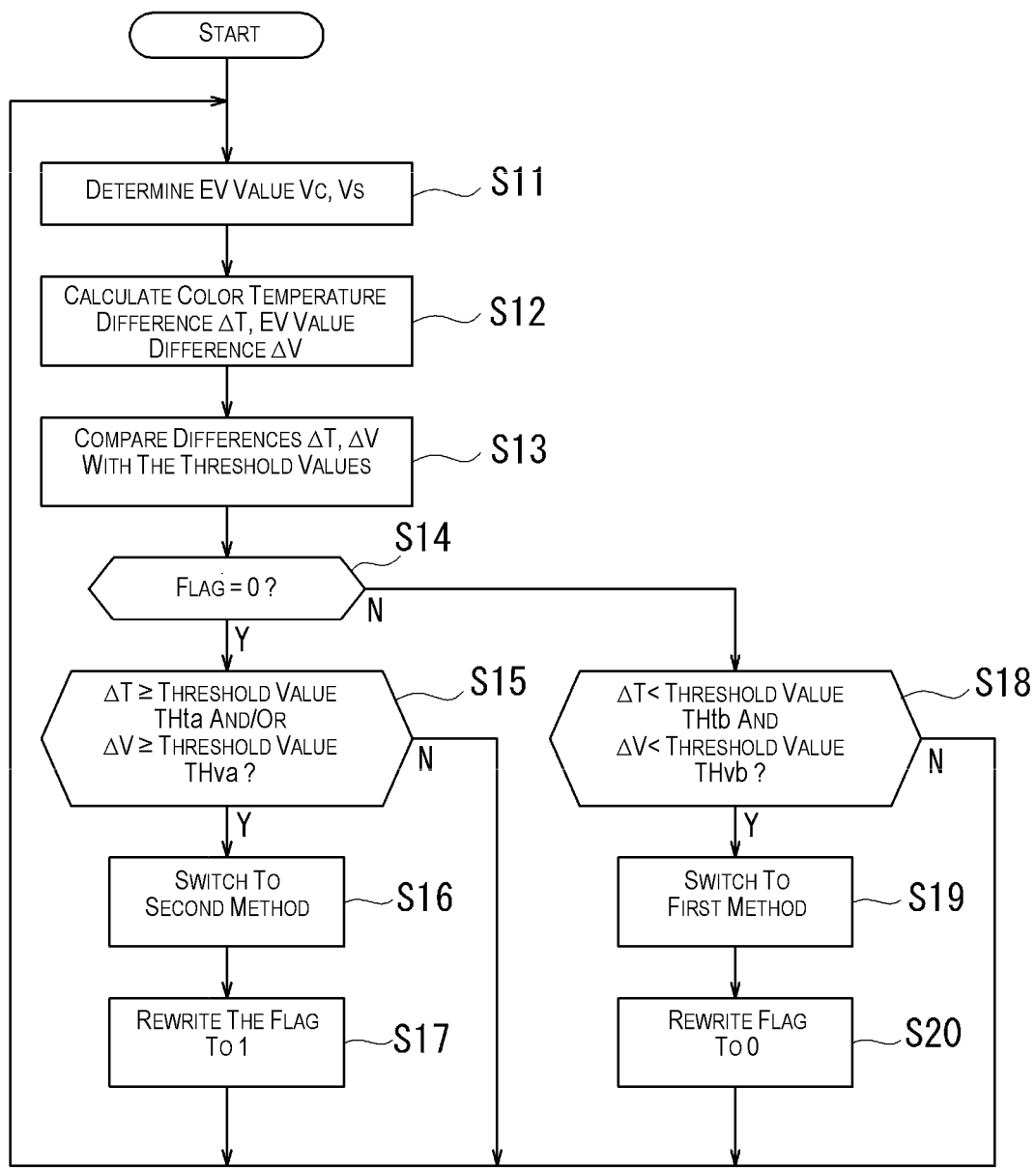
FIG. 7 is a flow chart showing the processing of the ISP control unit of the image display device of a modification example 1.

FIG. 7 is a flow chart showing the details of the processing of the ISP control unit 53 of the image display device 1 of modification example 1.

The processing of steps S11 to S14, S16 to S17, and S19 to S20 in FIG. 7 are the same as the processing of steps S01 to S04, S06 to S07, and S09 to S10 in the embodiment, so their explanation is omitted.

With the embodiment, the same threshold values THt, THv are used for the determination for switching from the first method to the second method (step S05 in FIG. 3) and the determination for switching from the second method to the first method (step S08 in FIG. 3).

With modification example 1, the two threshold values used for determining the switching were made to be different, and hysteresis characteristics were given.

As shown in FIG. 7, when a determination is made to switch from the first method to the second method, the comparison unit compares the color temperature difference ΔT and the EV value difference ΔV with the respective threshold values THta, THva (step S15). If one or both of the differences ΔT, ΔV are the threshold value THta, THva or greater (step S15: Yes), the comparison unit switches to the second method (step S16).

When a determination is made to switch from the second method to the first method, the comparison unit compares the color temperature difference ΔT and the EV value difference ΔV respectively with the threshold values THtb, THvb (step S18). If both the differences ΔT, ΔV are less than the threshold values THta, THva (step S18: Yes), the comparison unit switches to the first method (step S19).

The threshold value THtb of the color temperature and the threshold value THvb of the EV value used in step S18 are values smaller than the threshold value THta of the color temperature and the threshold value THva of the EV value used in step S15.

By doing this, for example, when the differences ΔT, ΔV of the color temperature and the EV value are fluctuating around the threshold values THta, THva, there is no frequent switching of the method between the first method and the second method, and the second method is maintained. Also, when fluctuation subsides and the divergence between the incident light IL and the reflected light RL is smaller, there is a switch again to the first method when the differences ΔT, ΔV are less than the threshold values THtb, THvb.

As described above, the image display device 1 of modification example 1
(4) comprises:
the comparison unit 533 (color temperature comparison unit) that compares the difference ΔT of the color temperature Tc and the color temperature Ts with the threshold value, and that determines switching between the first method (first white balance adjustment) and the second method (second white balance adjustment), wherein
the comparison unit 533 gives hysteresis characteristics to the threshold value THta for determining the switching from the first method to the second method, and the threshold value THtb for determining the switching from the second method to the first method.

Also, the image display device 1 of the modification example 1
(5) comprises
the comparison unit 533 (exposure value comparison unit) that compares the difference ΔV of the EV value Vc and the EV value Vs with the threshold value, and that determines the switching between the first method (first exposure control) and the second method (second exposure control), wherein
the comparison unit 533 gives hysteresis characteristics to the threshold value THva for determining the switching from the first method to the second method, and the threshold value THvb for determining the switching from the second method to the first method.

In a state such as when a water puddle is or is not reflected in the captured image after a rain shower, the color temperature Tc and the EV value Vc of the reflected light RL fluctuate easily, and fluctuation may continue around the threshold value. By giving hysteresis characteristics to the threshold values THta, THva for switching from the first method to the second method, and the threshold values THtb, THvb for switching from the second method to the first method, it is possible to suppress the AWB processing and the AE control from switching frequently between the first method and the second method. This makes it possible to stabilize how the images displayed on the displays 21, 22 look, and to reduce the communication cost between the ECU 50, the ISP 60, and the cameras 11, 12 when switching methods.

Modification Example 2

With the embodiment noted above, an example was explained using the color sensor 30 that can detect both the color temperature Ts and the illuminance Is, but the invention is not limited to this, and it is also possible to install the color temperature sensor and the illuminance sensor separately on the vehicle 100.

Modification Example 3

With the embodiment noted above, an example was explained in which the AWB processing of the captured image and the AE control of the cameras 11, 12 are performed with the ISP 60 comprised by the control device 40, but the invention is not limited to this. It is also possible to comprise the ISP inside the cameras 11, 12, and to have the AWB processing and the AE control performed in the cameras 11, 12. In this case, the cameras 11, 12 perform communication directly with the ECU 50, and receive the switching command of the first method and the second method from the ECU 50. Also, the cameras 11, 12 output the captured images after AWB processing to the ECU 50.

In the comparison processing using the threshold values noted above, the comparison objects used "the threshold value or greater" or "less than the threshold value" as the reference, but according to the setting of the threshold value, it is also possible to have the comparison objects use "greater than the threshold value" or "the threshold value or less" as the reference. Specifically, "the threshold value or greater" or "less than the threshold value" do not have to be applied exactly, and include both cases of not including and cases of including a value that is the threshold value.

EXPLANATION OF REFERENCE NUMERALS

1: Image display device; 11, 12: Camera; 21, 22: Display; 30: Color sensor; 40: Control device; 50: ECU; 51: Communication unit; 52: Display image output unit; 53: ISP control unit; 531: EV value determining unit; 532: Difference calculation unit; 533: Comparison unit; 60: ISP; 61: Detection unit; 62: WB adjustment unit (white balance adjustment unit); 63: Exposure control unit; 100: Vehicle; S: Light source; IL: Incident light; and RL: Reflected light.

The invention claimed is:

1. An image display device comprising:
a camera configured to capture an image of a rear of a vehicle;
a color temperature sensor installed at a front of the vehicle, the color temperature sensor being configured to detect a color temperature of incident light at the front of the vehicle;
at least one processor constituting
a color temperature detection unit configured to detect a color temperature of a captured image captured by the camera;
a white balance adjustment unit configured to perform adjustment of white balance of the captured image; and
a display configured to display the captured image adjusted by the white balance adjustment unit, wherein
when a difference between the color temperature of the captured image of the rear of the vehicle detected by the color temperature detection unit and the color temperature of the incident light at the front of the vehicle detected by the color temperature sensor is a color temperature threshold value or greater, the white balance adjustment unit is configured to switch from a first white balance adjustment based on the color temperature of the captured image to a second white balance adjustment based on the color temperature of the incident light.

2. The image display device according to claim 1, wherein the at least one processor constituting a color temperature comparison unit configured to compare the difference between the color temperature of the captured image and the color temperature of the incident light with the color temperature threshold value, and to determine whether to switch between the first white balance adjustment and the second white balance adjustment, wherein
the color temperature comparison unit is configured to give hysteresis characteristics to the color temperature threshold value for determining to switch from the first white balance adjustment to the second white balance adjustment, and the color temperature threshold value for determining to switch from the second white balance adjustment to the first white balance adjustment.

3. The image display device according to claim 1, further comprising:
an illuminance sensor installed at the front of the vehicle, the illuminance sensor being configured to detect a brightness of the incident light at the front of the vehicle, wherein
the at least one processor constitutes
an illuminance detection unit configured to detect a brightness of the captured image;
an exposure control unit configured to control an exposure of the camera, and
when a difference between the brightness of the captured image and the brightness of the incident light is a brightness threshold value or greater, the exposure control unit is configured to switch from a first exposure control based on the brightness of the captured image to a second exposure control based on the brightness of the incident light.

4. The image display device according to claim 3, wherein when one of the difference between the color temperature of the captured image and the color temperature of the incident light, and the difference between the brightness of the captured image and the brightness of the incident light is a corresponding one of the color temperature threshold value and the brightness threshold value or greater, the white balance adjustment unit is configured to switch to the second white balance adjustment and the exposure control unit is configured to switch to the second exposure control.

5. The image display device according to claim 3, wherein the at least one processor constitutes a brightness comparison unit configured to compare the difference between the brightness of the captured image and the brightness of the incident light with the brightness threshold value, and to determine whether to switch between the first exposure control and the second exposure control, wherein
the brightness comparison unit is configured to give hysteresis characteristics to the brightness threshold value for determining to switch from the first exposure control to the second exposure control, and the brightness threshold value for determining to switch from the second exposure control to the first exposure control.

6. An image display device comprising:
an imaging unit configured to capture an image of a rear of a vehicle;
a color temperature detection unit configured to detect a color temperature of a captured image captured by the imaging unit;
a color temperature sensor installed at a front of the vehicle, the color temperature sensor being configured to detect a color temperature of incident light at the front of the vehicle;
a white balance adjustment unit configured to perform adjustment of white balance of the captured image;
a display unit configured to display the captured image adjusted by the white balance adjustment unit;
an illuminance detection unit configured to detect a brightness of the captured image;
an illuminance sensor installed at the front of the vehicle, the illuminance sensor being configured to detect a brightness of the incident light at the front of the vehicle; and
an exposure control unit configured to control an exposure of the imaging unit, wherein
when a difference between the color temperature of the captured image detected by the color temperature detection unit and the color temperature of the incident light detected by the color temperature sensor is a color temperature threshold value or greater, the white balance adjustment unit is configured to switch from a first white balance adjustment based on the color temperature of the captured image to a second white balance adjustment based on the color temperature of the incident light, and when a difference between the brightness of the captured image and the brightness of the incident light is a brightness threshold value or greater, the exposure control unit is configured to switch from a first exposure control based on the brightness of the captured image to a second exposure control based on the brightness of the incident light.

7. The image display device according to claim 6, wherein when one of the difference between the color temperature of the captured image and the color temperature of the incident light, and the difference between the brightness of the captured image and the brightness of the incident light is a corresponding one of the color temperature threshold value and the brightness threshold value or greater, the white balance adjustment unit is configured to switch to the second white balance adjustment and the exposure control unit is configured to switch to the second exposure control.

8. The image display device according to claim 6, further comprising a brightness comparison unit configured to compare the difference between the brightness of the captured image and the brightness of the incident light with the brightness threshold value, and to determine whether to switch between the first exposure control and the second exposure control, wherein the brightness comparison unit is configured to give hysteresis characteristics to the brightness threshold value for determining to switch from the first exposure control to the second exposure control, and the brightness threshold value for determining to switch from the second exposure control to the first exposure control.

* * * * *